United States Patent
Touchet et al.

(10) Patent No.: US 7,737,225 B1
(45) Date of Patent: Jun. 15, 2010

(54) HIGH PERFORMANCE ELASTOMERIC COMPOUND

(75) Inventors: Paul Touchet, Woodbridge, VA (US); Alan R. Teets, Middletown, DE (US); David P. Flanagan, Alexandria, VA (US); Charles G. Pergantis, Wilmington, DE (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 1156 days.

(21) Appl. No.: 11/302,326

(22) Filed: Dec. 14, 2005

Related U.S. Application Data

(60) Provisional application No. 60/654,411, filed on Feb. 18, 2005.

(51) Int. Cl.
    *C08F 8/42* (2006.01)
(52) U.S. Cl. ............... 525/368; 525/329.1; 525/329.2; 525/329.3; 525/372
(58) Field of Classification Search ............... 525/368, 525/372, 329.1, 329.2, 329.3
See application file for complete search history.

(56) References Cited

U.S. PATENT DOCUMENTS

| | | | |
|---|---|---|---|
| 4,337,327 A | 6/1982 | Stoy | |
| 4,384,081 A | 5/1983 | Kubo et al. | |
| 4,450,254 A * | 5/1984 | Isley et al. | 524/399 |
| 4,464,515 A | 8/1984 | Rempel et al. | |
| 4,503,196 A | 3/1985 | Rempel et al. | |
| 4,843,114 A * | 6/1989 | Touchet et al. | 524/87 |

FOREIGN PATENT DOCUMENTS

| DE | 2538132 | 3/1977 |
|---|---|---|
| DE | 2913992 | 10/1979 |

OTHER PUBLICATIONS

"Peroxide cured HNBR/methacrylate blends with improved low temperature performance" Nick Sandland et al, Rubber World.

* cited by examiner

*Primary Examiner*—Bernard Lipman
(74) *Attorney, Agent, or Firm*—William W. Randolph; Christos S. Kyriakou

(57) ABSTRACT

An elastomer composition includes a polymer system made up of a majority of HNBR polymer and an optional polymer additive such as carboxylated nitrile, ethylene-propylene-diene rubber, isoprene rubber, chloroprene rubber, acrylonitrile-butadiene rubber, butyl rubber, isoprene rubber, natural rubber and hydrogenated carboxylated butadiene acrylonitrile terpolymer, and combinations thereof. The polymer system totals 100 parts by weight. A cure system for the elastomer composition includes 1.5 to 30 parts by weight of zinc, magnesium or calcium oxide, 15 to 50 parts by weight of an $\alpha,\beta$-ethylenically unsaturated carboxylic acid and an organoperoxide. Under vulcanization conditions, the elastomer composition cures through the in situ formation of a metal carboxylate. A degradation inhibitor for an elastomer composition that includes an amine and an imidazole along with an optional polymerized quinoline is noted to be particularly effective.

22 Claims, No Drawings

HIGH PERFORMANCE ELASTOMERIC COMPOUND

RELATED APPLICATION

This application claims priority of U.S. Provisional Patent Application Ser. No. 60/654,411 filed Feb. 18, 2005, which is incorporated herein by reference.

GOVERNMENT INTEREST

The invention described herein may be manufactured, used, and licensed by or for the United States Government.

FIELD OF THE INVENTION

The present invention in general relates to an elastomer and in particular to a highly saturated nitrile-based elastomer master batch formed through the in situ formation of a crosslinking agent so as to afford a high performance elastomeric compound well suited for tracks and treads.

BACKGROUND OF THE INVENTION

Longevity of elastomeric articles is a matter of concern in a variety of fields. The periodic replacement of elastomeric articles increases the cost of ownership of an article while also removing the associated equipment from service in order to effect replacement. The longevity of elastomers is a problem associated with a variety of commercial and military components such as vehicle tires and treads, drive belts, conveyor belts, and vibration damping pads. A typical elastomer for the production of such articles is a styrene-butadiene containing rubber. Conventional blends include styrene-butadiene rubber blended with natural rubbers and butadiene rubbers in order to provide a variety of performance and processing characteristics.

In order to provide high wear elastomeric articles having extended longevity, especially in high demand environments, highly hydrogenated acrylonitrile-butadiene rubber (HNBR) was developed as an elastomer having superior wear performance characteristics, particularly for heavy vehicle tread and tracks. The synthesis and properties of highly hydrogenated acrylonitrile-butadiene rubber (HNBR) is detailed in U.S. Pat. No. 4,843,114. Unfortunately, the vulcanization process detailed in U.S. Pat. No. 4,843,114 is susceptible to variations in ambient atmosphere thereby reducing article performance characteristics and reproducibility. These production variations led to periodic article replacement based on projected longevity of the poorest performing production variant, resulting in premature disposal of the majority of such articles.

Thus, there exists a need for an elastomeric compound having wear performance characteristics of elastomers that are amenable to reproducible vulcanization.

SUMMARY OF THE INVENTION

An elastomer composition includes a polymer system made up of a majority of HNBR polymer and an optional polymer blend with other polymers such as carboxylated nitrile, ethylene-propylene-diene rubber, isoprene rubber, chloroprene rubber, acrylonitrile-butadiene rubber, butyl rubber, natural rubber and hydrogenated carboxylated butadiene acrylonitrile terpolymer, and combinations thereof. High performance articles are produced when the HNBR polymer is highly saturated and has a degree of backbone bond unsaturation ranging from 1 to 20%. The polymer system totals 100 parts by weight. A cure system for the elastomer composition includes 1.5 to 30 parts by weight of zinc, magnesium or calcium oxide, 15 to 50 parts by weight of an $\alpha,\beta$-ethylenically unsaturated carboxylic acid and an organoperoxide. Under vulcanization conditions, the elastomer composition cures through the in situ formation of a metal carboxylate. The composition has superior physical properties and improved reproducibility relative to compositions into which hydroscopic metal carboxylates are added as a reagent. Peroxy esters are noted to provide superior in situ formation of metal carboxylates relative to dialkyl peroxides.

A degradation inhibitor for an elastomer composition that includes an amine and an imidazole along with an optional polymerized quinoline is noted to be particularly effective. In particular, 4,4'-bis(a-dimethylbenzyl)diphenylamine and zinc 2-mercaptotoluimidazole are noted.

Upon vulcanization, an elastomer composition of the present invention is suitable for the formation of a number of articles including tires, vehicle treads, belts, damping pads, bumpers, and shoe treads. These compositions are especially well suited for treads and tires of heavy vehicles common to mining, construction and military usage.

DESCRIPTION OF THE PREFERRED EMBODIMENTS

The present invention has utility in the production of, and as an elastomeric article. Through the in situ generation of a metal carboxylate curative, a superior rubber master batch is obtained, as compared to the comparable rubber mix formed by a conventional process. A nitrile polymer operative herein is a typically straight chain copolymer of a diene and an unsaturated nitrile. The unsaturated nitrile is most commonly a copolymer of butadiene and acrylonitrile. The grades of nitrile polymer vary in the relative acrylonitrile content. A formula corresponding to nitrile polymer monomers separately and in the context of a nitrile polymer follows:

butadiene:

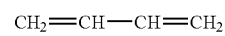

acrylonitrile:

nitrile polymer:

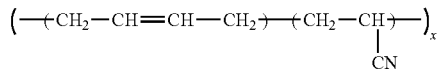

While the present invention preferably involves a highly hydrogenated nitrile polymer (HNBR) with a degree of unsaturation ranging from 1 to 20 backbone bond percent, it is appreciated that nitrile polymers having a degree of unsaturation outside this range are also operative herein as components of an inventive elastomer. All such grades of nitrile polymers are commercially available. In particular, highly hydrogenated nitrile polymers (HNBR) are detailed in U.S. Pat. Nos. 4,337,327; 4,384,081; 4,464,515 and 4,503,196 and German Patents 2,538,132 and 2,913,992. Hydrogenated nitrile polymers are commercially available from Nippon Zeon Company under the trade name ZETPOL in typical commercial grades including 5, 2.5 and 1% backbone bond percent degree of unsaturation.

A carboxylated nitrile is obtained through the inclusion of carboxylic groups within a nitrile polymer. A carboxylated nitrile contains acrylonitrile and butadiene monomers associated with a nitrile polymer and one or more types of acrylic acid containing monomer. A carboxylated nitrile is similar to a nitrile polymer as detailed herein with the inclusion of up to 5% of the polymer backbone carbon atoms having a carboxyl group pendent therefrom. It is appreciated that a carboxylated nitrile having a pendent group affords additional moieties through which nitrile polymer chains are crosslinked. Carboxylated nitriles operative herein are commercially available from Zeon Chemicals under the trade name Nipol and from Lanxess under the trade name Therban. Additionally, it is appreciated that a carboxylated nitrile is subjected to hydrogenation as disclosed above with respect to a nitrile polymer so as to reduce the degree of unsaturation therein. A hydrogenated carboxylated nitrile is described herein synonymously as a hydrogenated carboxylated butadiene acrylonitrile terpolymer. A carboxylated nitrile or hydrogenated carboxylated butadiene acrylonitrile terpolymer alone or in combination with natural rubbers constitutes a minority of the polymer system content of an inventive elastomer composition and as such makes up in total up to 50 weight percent of an inventive elastomer composition polymer component. Preferably, minority polymer system components are between 5 and 40% of the total polymer system component mass in order to produce high performance inventive elastomer compositions suitable for military vehicle treads and track pads.

An additional rubber additive operative herein optionally includes as a minority constituent a natural rubber, a synthetic diene rubber, styrene-butadiene rubber (SBR), polybutadiene rubber (NR), polyisoprene rubber (IR), ethylene-propylene-diene rubber (EPDM), chloroprene rubber (CR), butyl rubber (IIR), latex rubbers, epoxide-containing versions of each of the aforementioned rubbers, and combinations thereof. It is appreciated that an inventive elastomer composition in need of exceptional elongation characteristics is best formed through the use of a natural rubber, isoprene, or EPDM. Alternatively, a lower performance inventive elastomer composition produced at lower cost and having improved processing characteristics is likely obtained through the addition of a latex rubber. Epoxidized rubbers are best suited as an additive in an inventive elastomer composition in instances where additional rigidity is desirous to in part compensate for latex addition.

While a highly saturated nitrile polymer makes up a majority of the polymer system of an inventive elastomer composition, namely greater than 50 weight percent of the polymer system, it is appreciated that a polymer system made up of commercial grade pure highly saturated nitrile polymer is also operative herein. The polymer system component of an inventive elastomer composition totals 100 parts by weight.

A curing system of an inventive elastomer composition includes α,β-ethylenically unsaturated carboxylic acid monomer reactive with a metal oxide in the presence of peroxide to form a metal carboxylate. α,β-ethylenically unsaturated carboxylic acid monomers operative herein illustratively include acrylic acid, methacrylic acid, itaconic acid, fumaric acid, maleic acid and maleic anhydride. Typically, an α,β-ethylenically unsaturated carboxylic acid is present from 15 to 50 parts by weight. More preferably, the unsaturated carboxylic acid is present from 20 to 35 parts by weight.

A metal oxide operative herein includes zinc oxide, magnesium oxide and calcium oxide. A metal oxide is typically present from 1.5 to 30 parts by weight, the amount of metal oxide being determined by the relative formula weight of the unsaturated carboxylic acid. It is appreciated that a quantity of metal carboxylate acts as an accelerator for the vulcanization process and remaining metal carboxylate undergoes crosslinking with the polymer system components so as to further enhance the physical, mechanical and fatigue-resistant properties of an inventive elastomer composition.

Preferably, the metal oxide and unsaturated carboxylic acid are provided as a master batch dispersed within a quantity of the highly saturated nitrile polymer or an aliquot of the polymer system of an inventive elastomer composition. Through the use of such a master batch, a homogenous blend of components to vulcanization is more rapidly obtained.

A cure system for an inventive elastomer composition also includes an organoperoxide. The organoperoxide is typically present from 0.1 to 8 parts by weight, preferably 0.2 to 6 parts by weight, and most preferably 0.25 to 4 parts by weight per 100 parts per weight of polymer system. Organic peroxides operative herein illustratively include cumene hydroperoxide, diisopropylbenzene hydroperoxide, and 2,5-dimethylhexane-2,5-dihydroperoxide; dialkyl peroxides such as dicumyl peroxide, di-t-butyl peroxide and t-butylcumyl peroxide; diacyl peroxides such as benzoyl peroxide, 2,4-dichlorobenzoyl peroxide and bis-(3,5,5-trimethylhexanoyl) peroxide; peroxy ketals such as 2,5-dimethyl-2,5-di(t-butylperoxy)hexane, 1,3-di(t-butylperoxyisopropyl)benzene, 2,5-dimethyl-2,5-di(t-butylperoxy)hexyne-3 and 1,1-di(t-butylperoxy)-3,3,5-trimethylcyclohexane; and peroxy esters such as t-butylperoxy benzoate, 2,2'-bis(t-butylperoxydiisopropyl)benzene, and 1,3-di(t-butylperoxyisopropyl)benzene. A particularly preferred organic peroxide is a peroxy ester to obtain high performance elastomer composition according to the present invention, specifically is 2,2'-bis(t-butylperoxydiisopropyl)benzene in the amount of 0.25 to 4 parts by weight per hundred weight of polymer system is used. According to the present invention dialkyl peroxides, and specifically dicumyl peroxide, tend to be less effective in the synthesis of metal carboxylate under vulcanization conditions.

Other additives are readily added to an inventive elastomer composition in order to modify the processing properties thereof. Additives typically added to elastomer compositions include a filler such as carbon black, silica, calcium carbonate, cellulosic material and clay, alumina, talc, magnesium carbonate, aluminum hydroxide, magnesium hydroxide, titanium dioxide and combinations thereof; degradation inhibitors such as an antioxidant and an antiozonate; a detackifying agent; a softener; a plasticizer; and a processing aid. Carbon black is the preferred filler for the production of high performance elastomeric compositions according to the present invention alone or in combination with other fillers. More preferably, carbon black is the sole filler in an inventive elastomer composition. Carbon black is typically present from 10 to 80 parts by weight of carbon black per 100 parts by weight of polymer system. More preferably, the carbon black has a size distribution and resulting surface area of between 40 and 140 $m^2/g$ as determined by BET methodology. Specific grades of carbon black well suited for use in the present invention include N-110, N-121, N-220, N-330 or N-326 as determined by ASTM standard D-1765. It is appreciated that carbon black grades beyond those specifically designated herein are also operative through mixing to achieve elastomer composition performance comparable to that obtained from the above specifically recited carbon black grades. Alternatively, carbon black and several of the other aforementioned fillers are introduced into an inventive elastomer composition as a short fiber or whisker as a minority phase of the filler in order to induce surface roughening of an article produced from an inventive elastomer composition. Typical fiber lengths range from 0.1 to 6 mm with a diameter of from 5 to 150 μm. Of the fiber fillers, carbon fiber is particularly preferred.

An antioxidant and an antiozonate are collectively degradation inhibitors. These degradation inhibitors illustratively include a chemical functionality such as an amine, a phenol, an imidazole, a wax, a metal salt of an imidazole and combinations thereof. Specific degradation inhibitors operative herein illustratively include N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, 6-ethoxy-2,2,4-trimethyl-1,2-dihydroquinoline, N,N'-diphenyl-p-phenylenediamine, octylated diphenylamine, 4,4'-bis(a,a'-dimethylbenzyl)diphenylamine, 4,4'-dicumyl-diphenylamine, 2,5-di-tert-butyl-hydroquinone, 2,2'-methylene-bis(4-methyl-6-tert-butylphenol), 2,2'-methylenebis(4-methyl-6-methylcyclohexlphenol), 4,4'-thio-bis(3-methyl-6-tert-butylphenol), 4,4'-butylidene-bis(3-methyl-6-tert-butylphenol), tris(nonylated phenyl)phosphite, tris-(2,4-di-t-butylphenyl)phosphite, 2-mercaptobenzimidazole, and zinc 2-mercaptobenzimidazole. Degradation inhibitors are typically present from 0 to 20 parts by weight per 100 parts by weight of polymer system.

A particularly preferred degradation inhibitor system includes at least one amine and one imidazole. Optionally, a polymerized quinoline is also provided with the preferred degradation inhibitor system. The relative amounts of degradation inhibitor compounds preferably include 0.5 to 3 parts amine, 0.5 to 2.5 parts imidazole, and 0.5 to 1.5 parts of optional polymerized quinoline. Most preferably, the degradation inhibiting amine is 4,4'-bis(α-dimethylbenzyl)diphenylamine, the imidazole being zinc 2-mercaptotoluimidazole and the polymerized quinoline being polymerized 1,2-dihydro-2,2,4-trimethylquinoline.

A softener additive is provided to facilitate processing especially composition kneading. Softeners operative herein illustratively include petroleum-based oils; fatty acid oils such as linseed, rapeseed, and coconut; waxes such as lanolin, beeswax, linoleic acid, steric acid and lauric acid. A softener is typically present from 0.1 to 10 parts by weight per 100 parts polymer system.

A plasticizer is used as is conventional to the art and illustratively includes dialkyl phthalates where the alkyl groups include from 1 to 30 carbon atoms each and are linear, branched or cyclic, mixed alkyl benzyl phthalates, tetrahydrophthalic anhydride ester, dialkyl sebacates where the alkyl groups contain from 1 to 25 carbon atoms and are linear, branched or cyclic, acetyl alkyl citrates, dialkyl maleates and dialkyl fumarates.

An inventive elastomer composition is prepared by mixing and kneading together the polymer system, a cure system typically in the form of a master batch, and an organic peroxide along with optional additives. Mixing and kneading are typically performed with a roll kneader, a Banbury mixer or the like.

An inventive elastomer composition is vulcanized at a variety of temperatures typically ranging from 100 to 200° C. Preferably, vulcanization of an inventive elastomer composition occurs at a temperature between 154 and 166° C. The duration of vulcanization is appreciated to depend upon a variety of parameters illustratively including vulcanization procedure, vulcanization temperature, intended article shape and elastomer composition. A typical range of vulcanization times ranges from 30 seconds to several hours. The vulcanization process operative with an inventive elastomer composition includes conventional vulcanization techniques such as press heating, vapor heating, oven heating and hot air heating.

The present invention is further described with regard to the following non-limiting example which is intended to illustrate particular aspects of the present invention through comparison to non-inventive compositions.

Example 1

An inventive elastomer composition is prepared by mixing 66.5 parts by weight of highly saturated nitrile polymer (2030L, Zeon Corporation) having a bound ACN percentage of 36.2, an iodine value in mg/100 mg of 56, a Mooney viscosity at 100° C. of 57.5 and a specific gravity of 0.95; with 68 parts of a master batch containing 33.5% of highly saturated nitrile polymer and 34.5% by weight zinc methacrylate. 2 parts by weight zinc oxide, 1.5 parts by weight of 4,4'-bis (a-dimethylbenzyl) diphenylamine (Naugard® 445, Crompton Corporation), 1 part by weight of zinc 2-mercaptotoluimidazole (Vanox® ZMTI, R.T. Vanderbilt Company), 22.5 parts by weight N-326 carbon black, and 2 parts by weight of 2,2'-bis(t-butylperoxy diisopropylbenzene) are also intermixed resulting in a total formula weight of 163.5 parts. The kneaded elastomer composition is pre-formed through a rubber extruder, preheated to 82° C., placed in a mold and vulcanized at 165° C. for 80 minutes. A sample test track pad is assembled by placing applicable metal inserts and the extruded pre-heated elastomer composition into the mold with a heat activated adhesive, with the vulcanization occurring in a heated press. The physical properties of the resulting pad are presented in contrast to the comparative example of U.S. Pat. No. 4,843,114 in Table 1.

TABLE 1

Property Comparison Between the Comparative Example and the Elastomer Composition Per Example 1

| Mechanical Properties | Comparative Example U.S. Pat. No. 4,843,114 | Example 1 |
|---|---|---|
| Tensile strength, PSI | 3960 | 4692 |
| 200% modulus, PSI | 843 | 1337 |
| Elongation, % | 570 | 508 |
| Hardness, Shore A, Points | 78 | 76 |
| Bashore rebound, % | 30 | 25 |
| Abrasion, PICO rating | 690 | 978 |
| Tear strength, ASTM Die C | | |
| Ungaged, lb/in (tested @ room temp.) | 448 | 398 |
| After aged 4 hrs. @ 250° F. (tested at 250° F.) | 234 | 223 |
| Demattia flex properties Unaged | | |
| Crack growth rate, mils/min. After aging 20 hrs. at 250° F. | 6 | 14 |
| Crack growth rate, mils/min. Goodrich Flex @ 50° C. Temperature rise | 12 | 30 |
| Internal, ° C. | 84 | 118 |
| External, ° C. | 58 | 46 |
| Blowout #1 time @ 141.6 PSI, minutes | 5 | 38 |

The invention claimed is:

1. An elastomer composition comprising:
a polymer system comprising: a majority by polymer system weight of a polymer and an optional polymer additive selected from the group consisting of: carboxylated nitrile, ethylene-propylene-diene rubber, isoprene rubber, chloroprene rubber, acrylonitrile-butadiene rubber, butyl rubber, natural rubber and hydrogenated carboxylated butadiene acrylonitrile terpolymer, and combinations thereof, said polymer system totaling 100 parts by weight; and
a cure system comprising: 1.5 to 30 parts by weight of a metal oxide, said metal oxide selected from the group consisting of: zinc oxide, magnesium oxide and calcium oxide; 15 to 50 parts by weight of an $\alpha,\beta$-ethylenically unsaturated carboxylic acid; and an organoperoxide,
wherein said metal oxide and said $\alpha,\beta$-ethylenically unsaturated carboxylic acid are premixed with a portion of said polymer system to form a master batch and the polymer is crosslinked with a metal carboxylate that is generated in situ from metal oxide and the $\alpha,\beta$-ethylenically carboxylated acid in the presence of the organoperoxide.

2. The composition of claim 1 wherein said polymer is highly hydrogenated acrylonitrile-butadiene rubber.

3. The composition of claim 1 wherein said organoperoxide is $\alpha,\alpha$-bis(t-butylperoxy diisopropylbenzene).

4. The composition of claim 1 wherein said organoperoxide is a peroxy ester.

5. The composition of claim 1 further comprising a degradation inhibitor comprising a diphenylamine and an imidazole.

6. The composition of claim 5 wherein said diphenylamine is 4,4'-bis($\alpha$-dimethylbenzyl)diphenylamine and said imidazole is zinc 2-mercaptotoluimidazole.

7. The composition of claim 5 further comprising a polymerized quinine antioxidant.

8. The composition of claim 1 with the proviso that said organoperoxide is independent of a dialkyl peroxide.

9. The composition of claim 1 wherein said unsaturated carboxylic acid is methacrylic acid.

10. The composition of claim 1 further comprising 10 to 80 parts by weight of filler per 100 parts per weight polymer in a form selected from the group consisting of carbon black, short carbon fibers, and combinations thereof.

11. The composition of claim 1 vulcanized into an article.

12. The composition of claim 11 wherein said article is selected from the group consisting of: a tire, vehicle tread, belt, damping pad, bumper and shoe tread.

13. An elastomer composition comprising:
a polymer system comprising: a majority by polymer system weight of highly saturated nitrile polymer having a degree of backbone bond unsaturation ranging from 1 to 20%; and an optional polymer additive selected from the group consisting of: carboxylated nitrile, ethylene-propylene-diene rubber, isoprene rubber, chloroprene rubber, acrylonitrile-butadiene rubber, butyl rubber, natural rubber and hydrogenated carboxylated butadiene acrylonitrile terpolymer, and combinations thereof, said polymer system totaling 100 parts by weight; and
a cure system comprising: 1.5 to 30 parts by weight of a metal oxide, said metal oxide selected from the group consisting of: zinc oxide, magnesium oxide and calcium oxide; 15 to 50 parts by weight of an $\alpha,\beta$-ethylenically unsaturated carboxylic acid; and a peroxyester,
wherein said metal oxide and said $\alpha,\beta$-ethylenically unsaturated carboxylic acid are premixed with a portion of said polymer system to form a master batch and the polymer is crosslinked with a metal carboxylate that is generated in situ from metal oxide and the $\alpha,\beta$-ethylenically carboxylated acid in the presence of the organoperoxide.

14. The composition of claim 13 wherein said peroxy ester is $\alpha,\alpha$-bis(t-butylperoxy diisopropylbenzene).

15. The composition of claim 13 wherein said metal oxide and said carboxylic acid are premixed with a portion of said polymer system to form a master batch.

16. The composition of claim 13 further comprising a degradation inhibitor comprising a diphenylamine and an imidazole.

17. The composition of claim 16 wherein said diphenylamine is 4,4'-bis(a-dimethylbenzyl)diphenylamine and said imidazole is zinc 2-mercaptotoluimidazole.

18. The composition of claim 16 further comprising a polymerized quinine antioxidant.

19. The composition of claim 13 wherein said unsaturated carboxylic acid is methacrylic acid.

20. The composition of claim 13 further comprising 10 to 80 parts by weight of filler per 100 parts per weight carbon in a form selected from the group consisting of carbon black, short carbon fibers, and combinations thereof.

21. An improved method of forming an elastomer including the mixing of a highly saturated nitrile polymer having a degree of backbone unsaturation ranging from 1 to 20% with a metal acrylate containing cure system wherein the improvement lies in: crosslinking the polymer with a metal carboxylate generated in situ from metal oxide and an $\alpha,\beta$-ethylenically carboxylated acid in the presence of an organoperoxide, the metal oxide being selected from the group consisting of zinc oxide, magnesium oxide and calcium oxide.

22. The improved method of claim 21 wherein the peroxide is a peroxy ester.

* * * * *